Patented July 9, 1940

2,207,603

UNITED STATES PATENT OFFICE 2,207,603

MANUFACTURE OF ALIPHATIC AMINO-SULPHONIC ACIDS

Hans Wesche, Dessau in Anhalt, Germany, assignor to I. G. Farbenindustrie Aktiengesellschaft, Frankfort-on-the-Main, Germany No Drawing. Application May 22, 1939, Serial No. 275,059. In Germany May 23, 1938

3 Claims. (Cl. 260—513)

The present invention relates to new aliphatic amino-sulphonic acids and to a process for manufacturing the same.

The condensation of aliphatic amines with formaldehyde-bisulphite occurs, as is known, according to the following equation, wherein R stands for an aliphatic radical and M stands for a monovalent metal equivalent:

$RNH_2 + CH_2O \cdot MHSO_3 = RNH \cdot CH_2 \cdot OSO_2M + H_2O$

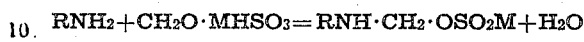

There is thus produced the sulphurous acid ester of an aliphatic substituted amino alcohol. During the condensation of aromatic sulphamides the corresponding sulphurous acid esters are formed in the same manner.

The present invention is based on the observation that by the condensation of aliphatic sulphamides of the general formula $RSO_2NH_2$ and the substitution products thereof with formaldehyde-bisulphites sulphonic acids are obtained according to the following equation:

$RSO_2NH_2 + CH_2O \cdot MHSO_3 =$
$RSO_2NH \cdot CH_2SO_3M + H_2O$

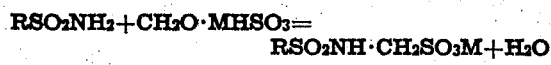

This course of the reaction could not be foreseen; it allows in a simple manner the manufacture of amino-sulphonic acids substituted in the amino group by the sulphonic acid radical. There is proceeded as follows: the aqueous solutions of the sulphamide in question and, for instance, of an alkali formaldehyde-bisulphite are caused to react by shortly heating. The alkali metal salts of the corresponding sulphonic acids are then obtained as bodies which readily dissolve in water and show a neutral reaction; these bodies may be caused to separate in known manner. Instead of an alkali formaldehyde-bisulphite another formaldehyde-bisulphite may be used with the same success, for instance, a formaldehyde-bisulphite of magnesium or aluminium. It is likewise possible to use mixtures of solutions of formaldehyde and the bisulphite compounds in question.

The sulphonic acids thus obtainable are characterized by a secondary amino group which allows further condensations. These compounds may serve among others for the synthesis of valuable substances, instead of methyl taurine and others, for the textile industry.

Example 1.—A solution of 19 parts of methyl-sulphamide in 20 parts of water is mixed with a solution of 27 parts of formaldehyde sodium bisulphite in 60 parts of water; by eliminating the water by distillation the methyl-sulphamido-methane sulphonic acid is obtained in the form of the sodium salt in a quantitative yield.

Example 2.—200 parts of a mixture of aliphatic sulphamide the values of analysis of which approximately correspond to the tridecane-sulphonamide are stirred, while boiling, with 162 parts of formaldehyde solution of 30 per cent. strength and 169 parts of sodium bisulphite dissolved in water. After the reaction is complete, this being recognized by the ready solubility in water of the reaction product, the product is evaporated under reduced pressure and dried. 420 parts of the yellowish pulverulent product are obtained.

The stearyl-sulphonamide may be transformed in the same manner into a readily water-soluble compound having the same properties.

It may be of advantage to carry out the reaction with solid formaldehyde-sodium-bisulphite in the presence of an organic solvent, such as xylene or the like and to eliminate the water of the reaction in an azeotropic manner. The products obtained show a very good wetting, dispersing, emulsifying, softening and cleansing power.

The reaction may be performed with sulphamides of any desired origin. It is, therefore, immaterial whether the sulphochlorides which are the basis for the amides have been obtained from the sulphonic acids or directly from the hydrocarbons concerned or the mixtures thereof by means of sulphurous acid and chlorine.

It is obvious that my invention is not limited to the foregoing examples or to the specific details given therein. As indicated in the general formula given above generally aliphatic sulphamides may be used as starting materials which correspond to the general formula $RSO_2 \cdot NH_2$, wherein R is a lower or higher alkyl radical with a branched or unbranched series of C-atoms.

Furthermore, instead of the formaldehyde-bisulphite compound there may be used a soluble bisulphite salt in the presence of a compound developing formaldehyde.

What I claim is:

1. The process which comprises reacting an aliphatic sulphamide of the general formula R—$SO_2NH$, wherein R is an alkyl radical, with formaldehyde and a water-soluble bisulphite metal salt.

2. The process which comprises reacting an aliphatic sulphamide of the general formula R—$SO_2NH$, wherein R is an alkyl radical, with a water soluble salt of formaldehyde-bisulphite.

3. The compound which corresponds to the general formula R·$SO_2NH \cdot CH_2SO_3M$, wherein R is an alkyl radical and M is an alkali metal.

HANS WESCHE.